US010176229B2

(12) United States Patent
Labbi et al.

(10) Patent No.: US 10,176,229 B2
(45) Date of Patent: Jan. 8, 2019

(54) GUIDED KEYWORD-BASED EXPLORATION OF DATA

(71) Applicant: INTERNATIONAL BUSINESS MACHINES CORPORATION, Armonk, NY (US)

(72) Inventors: Abderrahim Labbi, Thalwil (CH); Michail Vlachos, Rueschlikon (CH); Anastasios Zouzias, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 542 days.

(21) Appl. No.: 14/789,182

(22) Filed: Jul. 1, 2015

(65) Prior Publication Data

US 2016/0070708 A1 Mar. 10, 2016

(30) Foreign Application Priority Data

Sep. 4, 2014 (GB) .................................. 1415665.7

(51) Int. Cl.
G06F 17/30 (2006.01)

(52) U.S. Cl.
CPC ...... *G06F 17/3053* (2013.01); *G06F 17/3097* (2013.01); *G06F 17/30392* (2013.01); *G06F 17/30554* (2013.01)

(58) Field of Classification Search
CPC .......... G06F 17/3053; G06F 17/30392; G06F 17/30554; G06F 17/3097
USPC ........................................................ 707/723
See application file for complete search history.

(56) References Cited

U.S. PATENT DOCUMENTS

| 5,335,345 | A * | 8/1994 | Frieder ............. G06F 17/30474 |
| 6,985,899 | B2 | 1/2006 | Chan et al. |
| 7,617,205 | B2 * | 11/2009 | Bailey ................. G06F 17/3064 |
| 7,917,528 | B1 | 3/2011 | Dave et al. |
| 8,631,030 | B1 * | 1/2014 | Bhattacharjee ... G06F 17/30973 707/722 |
| 9,830,556 | B2 * | 11/2017 | Maarek ................ G06N 99/005 |
| 2002/0188777 | A1 * | 12/2002 | Kraft ...................... G06Q 10/10 710/100 |
| 2003/0126136 | A1 * | 7/2003 | Omoigui ............. G06F 17/3089 |
| 2006/0206477 | A1 * | 9/2006 | Dalvi ................ G06F 17/30542 |
| 2009/0112853 | A1 * | 4/2009 | Nishizawa ........ G06F 17/30516 |
| 2009/0216731 | A1 * | 8/2009 | Markovic ............. G06Q 10/10 |
| 2009/0228465 | A1 * | 9/2009 | Krishnamurthy ........................... G06F 17/30445 |

(Continued)

OTHER PUBLICATIONS

G.B. et al.,"Keyword Searching and Browsing in Databases Using Banks," Proceedings, 18th International Conference on data Engineering, Feb. 26-Mar. 1, 2002, pp. 1-10.
M.C. et al.,"Unicorn; A System for Searching the Social Graph," CiteSeerx, international conference on very large data bases(VLDB), Aug. 26, 2013, pp. 1-12.
S.A. et al.,"DBXplorer: A System for Keyword-Based Search Over Relational Databases," Proceedings 18th International Conference on Data Engineering, IEEE Xplore, 2002, pp. 1-12.

(Continued)

*Primary Examiner* — Mark E Hershley
(74) *Attorney, Agent, or Firm* — Cantor Colburn LLP

(57) ABSTRACT

A method for guided keyword-based exploration of data stored in a database includes providing, with a processing device, valid query templates for the data, wherein the provided valid query templates include static parts and dynamic parts; selecting those of the provided valid query templates that match a user-provided keyword; generating valid queries from the selected valid query templates using the data; and querying the data using a user-selected valid query selected from the generated valid queries.

15 Claims, 8 Drawing Sheets

(56) References Cited

U.S. PATENT DOCUMENTS

| | | | | |
|---|---|---|---|---|
| 2010/0070448 | A1* | 3/2010 | Omoigui | H01L 27/1463 706/47 |
| 2010/0205530 | A1* | 8/2010 | Butin | G06F 8/38 715/715 |
| 2010/0306249 | A1* | 12/2010 | Hill | G06F 17/30867 707/769 |
| 2013/0086026 | A1 | 4/2013 | Hebert | |
| 2013/0311446 | A1* | 11/2013 | Clifford | G06F 17/30469 707/719 |
| 2015/0379134 | A1* | 12/2015 | Bax | G06F 17/30867 707/722 |
| 2016/0070707 | A1* | 3/2016 | Wang | G06F 17/30522 707/730 |

OTHER PUBLICATIONS

S.S. "Under the Hood: Indexing and Ranking in Graph Search," Facebook Engineering, Mar. 14, 2013, pp. 1-9.

V.H. et al.,"Discover: Keyword Search in Relational Databases," Proceedings of the 28th international conference on very large data bases VLDB, 2002 ,pp. 1-12.

X.L. "Under the Hood: The Natural Language Interface of Graph Search'" White page, Apr. 29, 2013, pp. 1-9.

Labbi et al.; "Guided Keyword-Based Exploration of Data"; U.S. Appl. No. 16/053,951, filed Aug. 3, 2018.

List of IBM Patents or Patent Applications Treated as Related; Date Filed: Aug. 3, 2018, 2 pages.

* cited by examiner

GUIDED KEYWORD-BASED EXPLORATION OF DATA

FOREIGN PRIORITY

This application claims priority to Great Britain Patent Application No. 1415665.7, filed Sep. 4, 2014, and all the benefits accruing therefrom under 35 U.S.C. § 119, the contents of which in its entirety are herein incorporated by reference.

BACKGROUND

The present invention relates to a method and to a device for guided keyword-based exploration of data stored in a database.

Data analysis is a process which is useful in discovering relevant information in, suggesting conclusions from, and supporting decision making based on data stored in a database.

For example, analysis of historical data can offer valuable insights into past activities, transactions or interactions, which may in turn be used for predictive purposes. Hence, analysis of data stored in databases holds great importance for tasks such as strategic planning in large organizations. Data analysis can, however, be particularly challenging for non-technical users. One primary reason for this is that extensive knowledge of the underlying data and their data model, i.e., the way the data is structured and interrelated, is required in order to formulate queries which yield meaningful results.

Another primary reason is that user interfaces for data access usually cater for the needs of multiple groups of people with diverse access interests to the data. This results in user interfaces progressively becoming more feature-rich and difficult to operate. Even when exploration of data is facilitated by graphical user interfaces, users are typically exposed to its full complexity while using only a small fraction of its functionality. A well-known way to simplify user interaction is using keyword-based search.

Ways to search structured databases using keywords are proposed by DISCOVER (see reference [1]), DBXplorer (see reference [2]), BANKS (see reference [3]). Their key idea is that, given a set of keywords, the system looks for trees of tuples (candidate networks), connected through primary-foreign key links, that collectively contain all the query keywords. Despite the use of keyword-based search in above mentioned references, no simple and intuitive ways of exploring structured databases are published.

In Facebook's Graph Search (see references [4] and [5]), the underlying Unicorn (see reference [6]) system suggests, upon keyword input by the user, a list of possible queries to search the user's social graph. A set of hard-coded rules, e.g., 'in' denoting a location, is combined with different tokenizations of the keywords before the possible queries are ranked.

Accordingly, it is an aspect of the present invention to improve exploration of data stored in a database.

SUMMARY

In one aspect, a method for guided keyword-based exploration of data stored in a database includes providing, with a processing device, valid query templates for the data, wherein the provided valid query templates include static parts and dynamic parts; selecting those of the provided valid query templates that match a user-provided keyword; generating valid queries from the selected valid query templates using the data; and querying the data using a user-selected valid query selected from the generated valid queries.

In another aspect, a nontransitory, computer readable storage medium having computer readable instructions stored thereon that, when executed by a computer, implement a method for guided keyword-based exploration of data stored in a database, the method including providing valid query templates for the data, wherein the provided valid query templates include static parts and dynamic parts; selecting those of the provided valid query templates that match a user-provided keyword; generating valid queries from the selected valid query templates using the data; and querying the data using a user-selected valid query selected from the generated valid queries.

In another aspect, a system for guided keyword-based exploration of data stored in a database includes a providing entity, executed by a processing device, configured to provide valid query templates for the data, wherein the provided valid query templates include static parts and dynamic parts; a selecting entity, executed by the processing device, configured to select those of the provided valid query template that match a user-provided keyword; a generating entity, executed by the processing device, configured to generate valid queries from the selected valid query templates using the data, and a querying entity, executed by the processing device, configured to query the data using a user-selected valid query selected from the generated valid queries.

BRIEF DESCRIPTION OF THE DRAWINGS

Similar or functionally similar elements in the figures have been allocated the same reference signs unless otherwise indicated.

DETAILED DESCRIPTION

Figure 1:
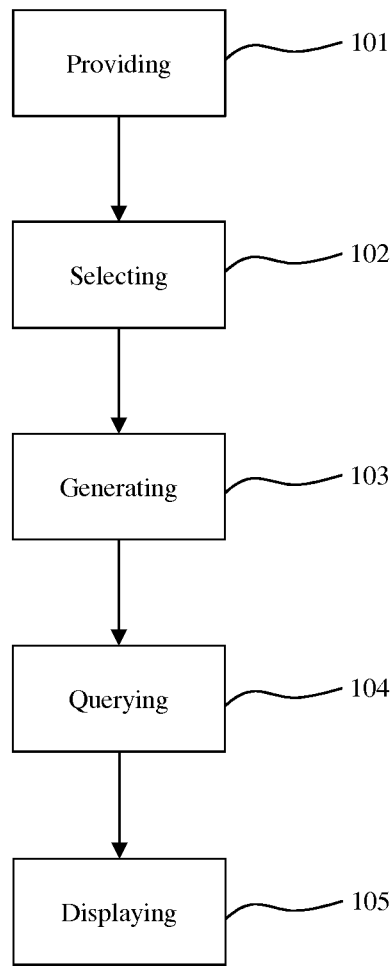
FIG. 1 is a first embodiment of a sequence of method operations for guided keyword-based exploration of data stored in a database.

According to a first aspect, a method for guided keyword-based exploration of data stored in a database is proposed. In a first operation, valid query templates for the data are provided, wherein the provided valid query templates include static parts and dynamic parts. In a second operation, those of the provided valid query templates are selected that match a user-provided keyword. In a third operation, valid queries from the selected valid query templates are generated using the data. In a fourth operation, the data is queried using a user-selected valid query selected from the generated valid queries.

Advantageously, the present guided keyword-based exploration of data stored in a database delivers answers to database queries without delving into the underlying data model of the database. This way, even nontechnical users may successfully enjoy direct query access to databases.

In particular, user-provided keywords are, via interactive recommendations to the user, turned into valid queries formulated in natural language that best cover the user-provided keywords. Valid queries imply that they may correspond to syntactically correct statements in database query language, such as SQL. In particular, the valid queries are in turn mapped to database query language and run against the database.

In particular, a keyword is a piece of a query that may be entered by the user. For example, a user may ask queries like "all clients who bought product X", or "all clients with expiring contracts for product Y". Queries are not verified to be convertible to syntactically and semantically correct database queries. This is in contrast to valid query templates (or valid query primitives), which are templates for creating valid queries that can be run against the database, with respect to the underlying data model of the database. That is to say, such templates capture the universe of potential queries that can be run against a given database.

Valid queries are instantiated from or specific realizations of valid query templates. That is, valid queries can be run against the database, and will yield meaningful query results. Static parts are elementary building blocks of a valid query template, and their content may not be altered by the user. Dynamic parts are the other elementary building blocks of a valid query template. The content of such a dynamic part may be altered by the user. This may, for example, be achieved by offering the user several alternatives for the content to choose from. According to some implementations, the chosen content may also be edited in addition. Particularly, such a modification generates a valid query from a valid query template.

In an embodiment, the method of the first aspect further comprises the following operations: in a fourth operation, subsets of the generated valid queries are ranked. In a fifth operation, a top-ranked subset of the ranked subsets is presented to the user. In a sixth operation, the data is queried using a user-selected valid query selected from the presented top-ranked subset. Advantageously, the user is presented with only a subset of the generated valid queries which is determined to be most significant to the user, by maximizing a respective ranking metric.

A ranking metric is a metric according to which a ranking can be determined. In particular, a ranking metric may take into account the relevance of the individual valid queries in the considered subset, or the diversity between the individual valid queries in the considered subset, or a mix of both.

For example, short keywords, keyword fragments and/or keywords frequently used in databases may create many matches in the data or the data model of a given database. This potentially results in a large number of generated valid queries, which may overwhelm the user by their sheer number, and at the same time, the user may not be able to distinguish a large number of valid queries in terms of how significant they are with respect to his keywords.

In a further embodiment, the valid query templates are provided such that they include the static parts, the dynamic parts and a view template. The data queried using a user-selected valid keyword is displayed using the view template. Advantageously, interface complexity is limited by a view template associated with each of the valid query templates. Further, a best possible display of the query results is obtained.

The user is only presented with a simple interface that is relevant to the particular valid query template. For example, if the user asks for "Contracts about Client X", then only a list of relevant contracts may be shown. A query for "Products bought by Client X" may provide a different view that only captures the relevant products. For example, a view template may predetermine the display of the query results in terms of content, arrangement and/or style of the query results. Valid queries such as "[Contracts of] [client.name]" or "[client.name] [who bought] [product.productName]" include the static parts "[Contracts of]" and "[who bought]" and the dynamic parts "[client.name]" and "[product.productName]".

In a further embodiment, the data may be embodied as structured or semi-structured data. Advantageously, guided keyword-based exploration is not only applicable to structured data such as relational databases, but also to semi-structured data with a self-describing structure, that uses tags or other markers to separate semantic elements. Also, graph databases are accessible via the proposed method.

In a further embodiment, the valid query templates are derived via an analysis of a query log of the data or are given by a user. Advantageously, valid query templates for a given database may be extracted from the query log of that database, which automates, simplifies and enhances reliability of the prearrangements for guided keyword-based exploration of the database. The templates may be also accompanied by a valid parameterized statement in a database query language such as SQL or similar, which is also derived from the query log of the given database. Alternatively, valid query templates may be provided on a manual basis.

In a further embodiment, the static part of the valid query template includes a text label representing a set of tuples of a first entity. Advantageously, static parts of a valid query template constrain the formulation of queries in such a way that only valid queries emerge. A static part of a valid query template defines the eligible dynamic parts in that particular valid query template.

For example, in the valid query template "[client.name] [who bought] [product.productName]" the static part "[who bought]" determines the presence of the dynamic parts "[client.name]" and "[product.productName]". In particular, a text label is a text string which unambiguously identifies a static part. Particularly, the static part of a valid query template identifies a set of tuples of an entity of the database, where a tuple is a finite function that maps attributes to values. For example, a tuple may correspond to a row of a table of a relational database. Hence, a static part may represent a set of rows of a table, up to a complete table, of a relational database.

An entity is a finite set of tuples all having the same finite set of attributes. For example, in a relational database, an entity corresponds to a table. An attribute is a distinct name identifying an individual tuple element. In a relational database, an attribute corresponds to a column name of a table. The keywords entered by the user need not necessarily exist in the same tuple or entity of a database.

In a further embodiment, the dynamic part of the valid query template includes attribute names and synonyms thereof representing at least one attribute of the first entity or of a second entity with a primary-foreign key dependency to the first entity. Advantageously, dynamic parts of a valid query template allow for variation of valid query templates such that different valid queries may be instantiated from a single valid query template.

A dynamic part of a valid query template identifies an attribute of an entity of the database, where an attribute is a distinct name identifying an individual tuple element of the entity. For example, an attribute corresponds to a column of a table of a relational database. Therefore, a dynamic part may represent a column of a table of a relational database, or content, i.e., actual data, thereof. For example, "clients" and "customers" are synonyms for the same attribute of an entity.

In particular, a dynamic part may represent an attribute in a first entity that was defined by a static part. Valid queries instantiated from such a valid query template extend over a single entity of a database. Alternatively, a dynamic part may also represent an attribute in a second entity which is different from the first entity defined by the static part. In such a case, the involved first and second entities may be interrelated via primary-foreign key dependencies. For examples, such dependencies may extend across more than two entities, i.e., involve intermediate entities as well.

In particular, primary-foreign key dependencies form the links between the entities of a database. A primary key may unambiguously identify a tuple in a particular entity of a database, and may occur multiple times as a foreign key in other entities of the database, this way forming 1:N relations, i.e., a tuple in a particular entity of a database, such as a customer, for example, may be referred to several times in other entities of the database, such as contract or contact entities, for example.

In a further embodiment, the valid query template is selected if the text label representing the set of tuples of the first entity matches the user-provided keyword. Advantageously, the selection of valid query templates according to a keyword match eliminates the need to know the underlying data model of a database. Matching may take place as the user enters keywords, i.e., based on fractionally entered keywords. Hence, as the user types in keywords, matching results may successively improve. A keyword or fractionally entered keyword may match one or more valid query templates. In some implementations, keywords matched during selection of valid query templates are removed from the query, i.e., they are not available for further matches against valid query templates or database content.

In a further embodiment, the valid query is generated by populating the attribute names of one of the selected valid query templates by a sub-quantity of the data represented by the attribute names or the synonyms thereof, if the sub-quantity of the data matches the user-provided keyword. A valid query (or question) is created from a valid query template by instantiation, i.e., by populating the valid query template with actual data from the database. The user-provided keywords are matched against the actual data of the database that corresponds to one of the dynamic parts in the underlying valid query template. Matching may take place as the user enters keywords, i.e., based on fractionally entered keywords. Hence, as the user types in keywords, matching results may successively improve. In case of a match, a copy of the valid query template may be created, with the dynamic part corresponding to the matched actual data being replaced by the matched actual data. This operation may be carried out several times, depending on the availability of dynamic parts to be replaced and of keyword input to be matched.

Valid query templates may be combined via logical operators such as AND, OR and NOT for formulating increasingly more complex statements. Replacing all dynamic parts of a valid query template by actual data corresponding to the respective dynamic parts turns the valid query template into a valid query, as it is ready to be run against the database. If not all of the dynamic parts of a valid query template are replaced, then further keyword input from the user is required.

In a further embodiment, the matching is based on a combination of string similarity measures. For example, matching may be based on search principles such as prefix, edit distance, or phonetic matching, or combinations thereof. In a further embodiment, the subsets of the generated valid queries are ranked according to a metric which accounts for the user, and relevance and coverage of one of the generated valid queries of one of the subsets, and diversity among the generated valid queries of one of the subsets. Advantageously, introducing a measure of significance for the generated valid queries provides a ranking according to which the most significant valid queries may be presented to the user first.

The measure of significance may involve properties referring to individual valid queries, such as relevance or coverage of the valid query, or to properties of a group of valid queries, such as diversity among the valid queries in a subset of valid queries. For example, a measure of significance may maximize a sum of minimal diversity (distance) among the valid queries in a subset of valid queries, and of minimal coverage (which includes relevance, as will be mentioned below) of the valid queries in the subset. Diversity and relevance metrics may be balanced by weighting the two measures relative to each other (via a factor $\lambda$). For such a MaxMinDispersion problem, published solution algorithms readily exist.

In a further embodiment, the relevance of the generated valid query of one of the subsets is determined by a degree to which it matches with the user-provided keyword. The relevance of a generated valid query may be defined as the degree to which it matches with a user-provided keyword, using the above-mentioned string similarity measures. For example, when matching a user-provided keyword against actual data of a database, the number of characters of the data to be edited in order to arrive at the considered keyword may serve as a degree of matching. Every string similarity measure may provide such a metric for the degree of matching, and several such metrics may be combined to provide a combined matching metric for assessing the relevance of individual valid queries with regard to the considered keyword. As a valid query may consist of several static or dynamic parts, and since keyword matching is used to select every static part and to populate every dynamic part with actual data, a number of keyword matches may be involved in assessing the relevance of an individual valid query. In such a case, an average of the relevance metrics of the involved keyword matches may be calculated. That is, the relevance metric for a valid query may be a sum of the relevance metrics of the involved keyword matches, divided by the number of involved keyword matches (or, equivalently, of the involved static and dynamic parts).

In a further embodiment, the coverage of the generated valid query is determined by a sum of relevance of all potential valid queries which can be composed out of the generated valid query. Situations may arise where a valid query was generated, but can be extended to a more complex valid query according to the data model of the underlying database. For example, this may be done by combining several valid queries using logical operators, or by cascading several attribute requirements in a valid query. Hence, the relevance of the descendants of a valid query, i.e., the potential valid queries which can be composed out of a valid query, may also be taken into account for ranking purposes. The coverage of a valid query, i.e., the relevance of all of its descendants, may be calculated from the relevance metrics of the individual descendants. For example, the relevance metrics of the individual descendants may first be normalized by their dissimilarity (also called distance) with respect to the valid query. For the trivial case of identical valid queries (or templates), whose distance is zero by definition, the distance is incremented by one in order not to cause a division by zero.

In particular, the dissimilarity of a pair of valid queries (or templates thereof) may be determined similarly to the edit distance measure mentioned above in the context of string similarity. For example, applied to valid queries, the distance of two given valid queries (or templates) is the number of static and/or dynamic parts to be removed and/or added in order to arrive at the respective other valid query (or template). After normalizing the relevance metrics of the individual descendants, these metrics may then be summed up to a combined relevance metric of all descendants, i.e., the coverage metric, of the valid query.

In a further embodiment, the diversity of a subset of the generated valid queries is determined by a minimum dissimilarity of any two valid queries in the subset of the generated valid queries. Measuring the significance of valid queries based on properties of individual valid queries alone, such as relevance or coverage, may yield valid queries that are not satisfactory to the user. Therefore, other properties which relate to groups of valid queries, such as diversity among the valid queries in a subset of all the generated valid queries, may facilitate to determine subsets of valid queries which are more significant to the user than other subsets. The diversity of a subset of valid queries may be assessed by measuring the dissimilarity (or distance) of all the pairs of valid queries that can be formed within the subset of valid queries, and providing the minimum dissimilarity (or distance) measured within the subset as a resulting diversity metric.

In a further embodiment, the ranking of the subsets of the generated valid queries is performed by a ranking algorithm operating on a tree data structure which represents all valid queries into the data, the ranking algorithm exploiting structural properties of the tree data structure. Advantageously, the process of ranking of the generated valid queries may be accelerated significantly by mapping of valid queries (and templates) as a rooted tree structure, i.e., a query tree, so that this process may be performed interactively and matching results may successively improve as the user types in keywords.

According to some implementations, algorithms developed for generic graphs and expensive in time complexity may be adopted for interactive ranking of the generated valid queries, after adaptation to and exploiting the specifics of tree structures. Furthermore, metrics for coverage and diversity (or distance) may easily be derived for tree structures, too. For a tree representation of valid query templates, their static parts and dynamic parts are modelled as nodes which are linked to each other in order of their appearance in the respective valid query template. Hence, a valid query template is represented as a chain of nodes.

A query tree is constructed by having the starting node of all valid query templates linked to a root node, and merging nodes wherever identical nodes exist in the same position within the respective chains of nodes. For example, after merging is completed, each path from the root node to a leaf node in a query tree corresponds to a valid query template (or a valid query). In database query language, children of (i.e., nodes directly adjacent to) the root node correspond to entities of the database. These entity nodes may in turn have children which represent SELECT or PROJECT conditions or JOIN operations to other entities, i.e., primary-foreign key dependencies, which may occur recursively for dependencies across several entities of a database. Hence, the conditions constrain the results returned from the preceding entity. Special connector nodes may combine children of root (entity nodes) to express logical operators such as AND, OR and NOT.

The published solution algorithms for the MaxMinDispersion problem have been devised for generic graphs. Both exact (i.e., optimal) and approximate solution algorithms exist, where the former is known to be NP-hard and the latter has a time complexity of $O(n^2)$, where n represents the number of paths (i.e., valid query templates). Simplification of the published solution algorithms exploiting the specifics of tree structures yields time complexities of $O(n^2 \cdot \log n \cdot \log k)$ and $O(n \cdot k^2)$ for optimal and approximate solutions, respectively, where k represents the number of paths in a subset.

For example, as valid query templates correspond to paths in the query tree, a metric for the distance between two valid query templates may, applied to a query tree, be defined as the shortest distance in the tree structure between the leaves of the two corresponding paths. Using this definition, also the coverage metric may be re-defined as a sum of normalized relevance values of the individual descendants of the path.

Any embodiment of the first aspect may be combined with any embodiment of the first aspect to obtain another embodiment of the first aspect.

According to a second aspect, the invention relates to a computer program comprising a program code for executing at least one operation of the method of the first aspect for guided keyword-based exploration of data stored in a database when run on at least one computer.

According to a third aspect, a device for guided keyword-based exploration of data stored in a database is proposed. The device comprises a providing entity, a selecting entity, a generating entity and a querying entity. The providing entity is configured to provide valid query templates for the data, wherein the provided valid query templates include static parts and dynamic parts. The selecting entity is configured to select those of the provided valid query templates that match a user-provided keyword. The generating entity is configured to generate valid queries from the selected valid query templates using the data. The querying entity is configured to query the data using a user-selected valid query selected from the generated valid queries.

In an embodiment, the device of the third aspect is embodied as a graphical user interface.

The respective entity, e.g., the providing entity, the selecting entity, the generating entity, and the querying entity, may be implemented in hardware and/or in software. If said entity is implemented in hardware, it may be embodied as a device, e.g., as a computer or as a processor or as a part of a system, e.g., a computer system. If said entity is implemented in software it may be embodied as a computer program product, as a function, as a routine, as a program code or as an executable object.

In the following, exemplary embodiments of the present invention are described with reference to the enclosed figures.

In FIG. 1, a first embodiment of a sequence of method operations for guided keyword-based exploration of data stored in a database is shown.

The data explored by the present method may be structured data or semi-structured data. Thus, the database for storing that data may be embodied in different forms. For example, the database may be structured in a sense that there is a well-defined data model describing the entities and the relations between the entities of the database. An example may be a relational database that contains structured data. As an alternative, a database may be used which has its data model "inline", i.e., which is self-describing. Such a database with an "inline" data model may use tags or other markers to separate semantic elements. Furthermore, also graph databases may be explored using the present method, too.

The method of FIG. 1 has the following method operations 101-105:

In operation 101, valid query templates 20 for the data are provided, wherein the provided valid query templates 20 include static parts 21 and dynamic parts 22.

Valid query templates 20 capture the universe of potential valid queries which can be run against a given database. More specifically, a valid query template 20 encapsulates a class of potentially infinite valid queries according to the underlying data model of the given database. In other words, the data model of a given database allows delineating a finite number of such valid query templates 20, and as long a user deploys one of these valid query templates 20, a valid query relating to this data model will emerge. Valid query templates 20 are preferably derived via an analysis of a query log of the data. Alternatively, they may be given or modified by a user.

A static part 21 of a valid query template 20 relates to an entity or a set of tuples thereof, and determines the type of the query results, i.e., if what will be returned is a client or a news element, for example. Due to this decisive role, static parts may not be changed by the user frequently. Given a proper set of valid query templates 20, it is nevertheless possible to explore a database to its full extent.

A dynamic part 22 of a valid query template 20, in contrast, is a kind of a filter or constraint applied to an entity, i.e., they are used to constrain the results of the static parts 21. Dynamic parts 22 can be seen as a kind of a "wildcard" element for all the potential values of an attribute of an entity, and can be restricted to represent only a subset of these potential values later on, thus constraining the set of tuples represented by a static part 21.

In operation 102, those of the provided valid query templates 20 are selected that match a user-provided keyword. When a user provides a query, which may consist of one or more keywords, the proposed method tries to determine if there is a match between any keyword and any of the static parts 21 or dynamic parts 22 of the valid query templates 20. A matching may be based on a combination of string similarity measures. As a result, a list of valid query templates 20 is selected from the available ones.

Figure 7:
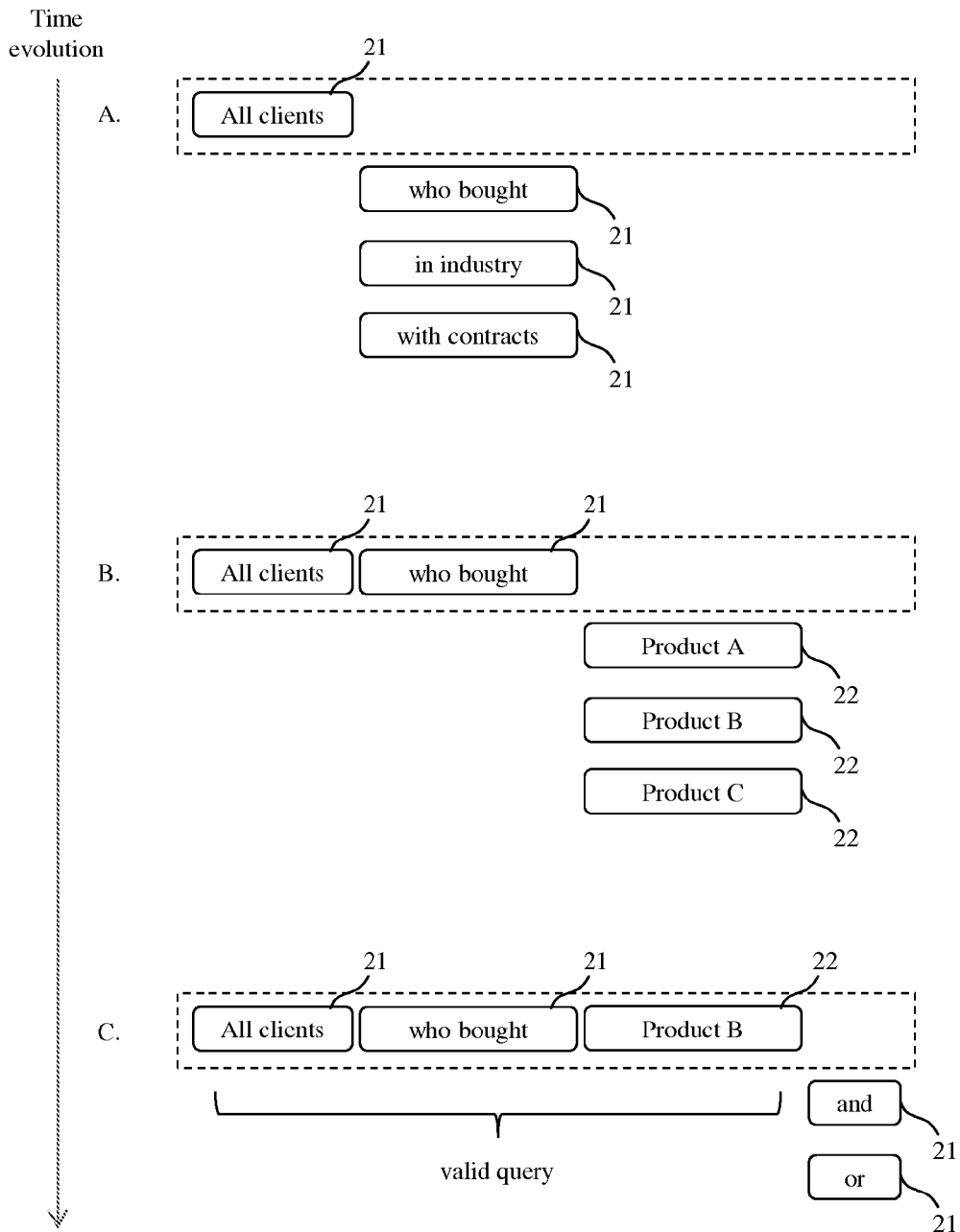
FIG. 7 is a schematic diagram illustrating the creation of an exemplary valid query over time using both static parts and dynamic parts of the valid query templates.

In operation 103, valid queries are generated from the selected valid query templates 20 using the data. Creating valid queries involves an instantiation of the valid query from one of the valid query templates 20, i.e., the dynamic parts 22 of the valid query template 20 need to be replaced by actual data being represented by the dynamic part 22. For example, hints for this replacement can be provided by matching the remaining keywords of the user-provided query against the actual data being represented by the dynamic part 22. Also this matching is based on a combination of string similarity measures. Once a matched is found, a valid query is created from the respective valid query template 20. FIG. 7 is a schematic diagram illustrating the creation of an exemplary valid query over time using both static parts 21 and dynamic parts 22 of the valid query templates 20.

In operation 104, the data is queried using a user-selected valid query selected from the generated valid queries. The user is presented with the list of valid queries and is prompted for a selection from that list. Once a selection is made, the valid query is run against the database. In operation 105, the data queried is displayed using a user-selected valid keyword and using a view template 23. The query results obtained from the database are presented in a way that is predetermined by the view template 23 associated with the valid query template 20 which was used to generate the valid query. For example, the content, arrangement and/or style of the query results may be defined by the view template 23, this way keeping the user interface simple and intuitive.

Figure 2:
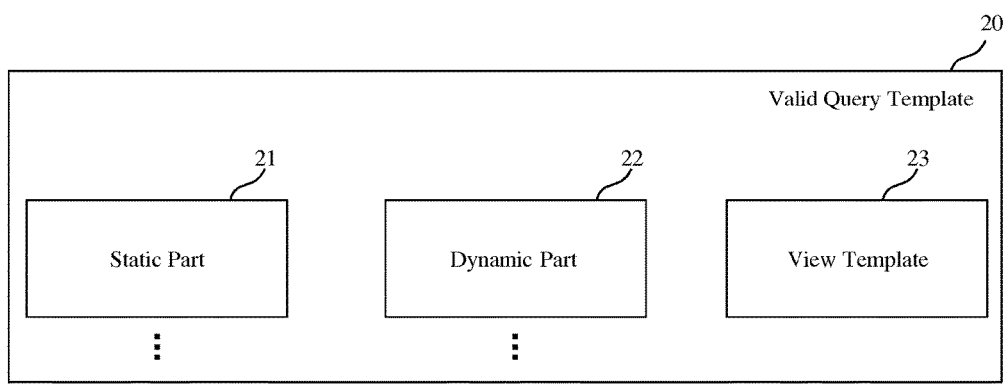
FIG. 2 is a schematic block diagram of a valid query template.

In FIG. 2, a schematic block diagram of a valid query template 20 is shown. As mentioned above, a valid query template 20 may include one or more static parts 21, one or more dynamic parts 22, and a view template 23 which governs the presentation of the data queried using the respective valid query template 20.

Figure 3:
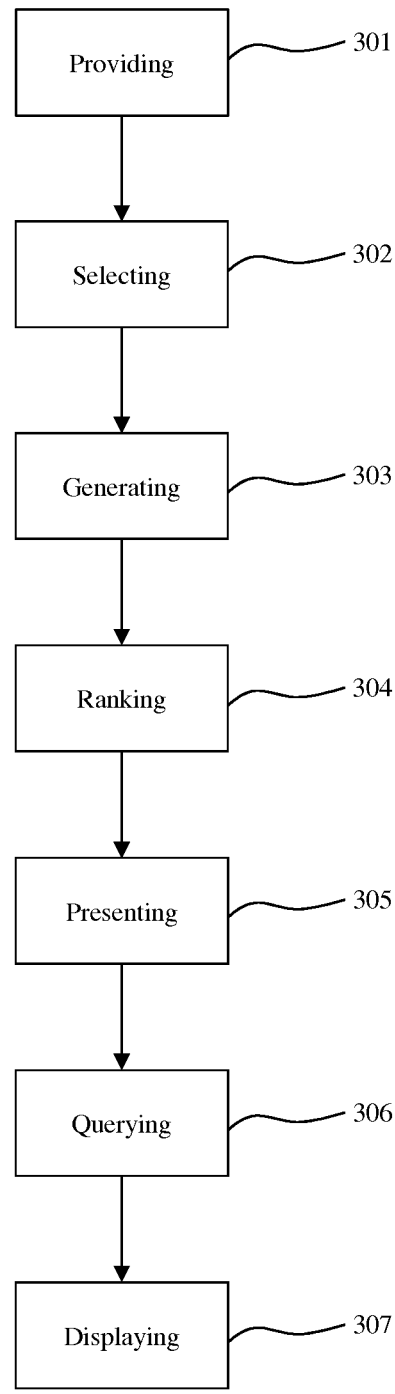
FIG. 3 is a second embodiment of a sequence of method operations for guided keyword-based exploration of data stored in a database.

In FIG. 3, a second embodiment of a sequence of method operations for guided keyword-based exploration of data stored in a database is shown. The method of FIG. 3 has the following method operations 301-307: In operation 301, valid query templates 20 for the data are provided, wherein the provided valid query templates 20 include static parts 21 and dynamic parts 22. This operation may be identical to operation 101 above. In operation 302, those of the provided valid query templates 20 are selected that match a user-provided keyword. This operation may be identical to operation 102 above. In operation 303, valid queries are generated from the selected valid query templates 20 using the data. This operation may be identical to operation 103 above. In operation 304, subsets of the generated valid queries are ranked. This is to present a short list of valid queries to the user which is most significant to him, rather than a full list of valid queries.

The ranking is performed according to a ranking metric, which accounts for user preferences, for relevance and coverage of individual valid queries, and diversity within subsets of the valid queries. The idea is to award a high ranking not to individual valid queries, but to groups of (i.e., subsets of all) valid queries which together are more significant to the user because they present different aspects from a database. The relevance of a generated valid query is determined by a degree to which it matches with the user-provided keywords. For example, edit distance, i.e., the number of characters to be altered in order to arrive at a given keyword is one of several possible metrics for measuring relevance. The coverage of the generated valid query is determined by a sum of relevance of all potential valid queries which can be composed out of the generated valid query. The diversity of a subset of valid queries can be obtained, for example, by determining a minimum dissimilarity of any two valid queries in the subset.

Ranking of the subsets of the generated valid queries is performed by a ranking algorithm, which takes into account the above-mentioned metrics for relevance (implicit), coverage and diversity and operates on a tree data structure which represents all valid queries into the database. As the proposed ranking algorithms exploit structural properties of tree data structures, the time complexity of these algorithms becomes simple enough to perform ranking interactively, as the user types in keywords character by character, for example.

In operation 305, a top-ranked subset of the ranked subsets is presented. In operation 306, the data is queried using a user-selected valid query selected from the presented top-ranked subset. As valid query templates 20 are accompanied by a valid parameterized statement in a database query language such as SQL or similar, so are valid queries in the top-ranked subset of valid queries which is presented to the user. Once the user selects one of the presented valid queries, the statement in database query language is run against the database to obtain the answer to the user-selected valid query. In operation 307, the data queried is displayed using a user-selected valid keyword and using the view template 23. This operation may be identical to operation 105 above.

Figure 4:
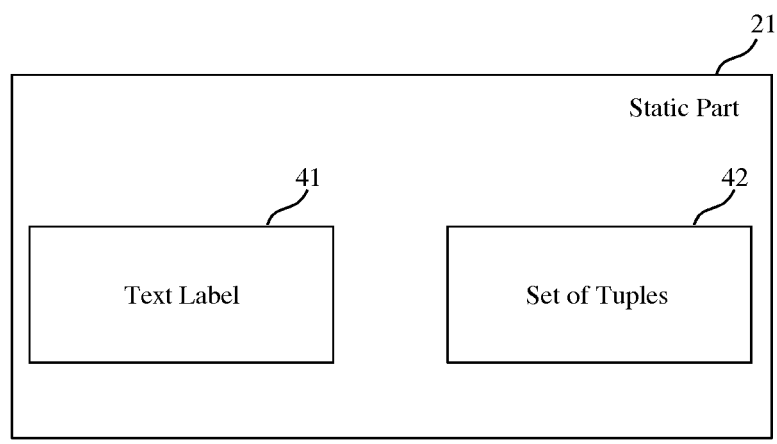
FIG. 4 is a schematic block diagram of a static part of a valid query template.

In FIG. 4, a schematic block diagram of a static part 21 of a valid query template 20 is shown. A static part 21 is comprised of a text label 41 representative for the static part 21 and of a set of tuples 42 of a first entity. When selecting valid query templates 20 from the valid query templates 20 available for the given database, matching against this text label 41 is performed. Furthermore, the user needs to know about the semantics of the static part 21, which is why static parts 21 are given descriptive names. In addition, a static part 21 is associated with a set of tuples 42 of a first entity which determines the data to be queried within the database.

Figure 5:
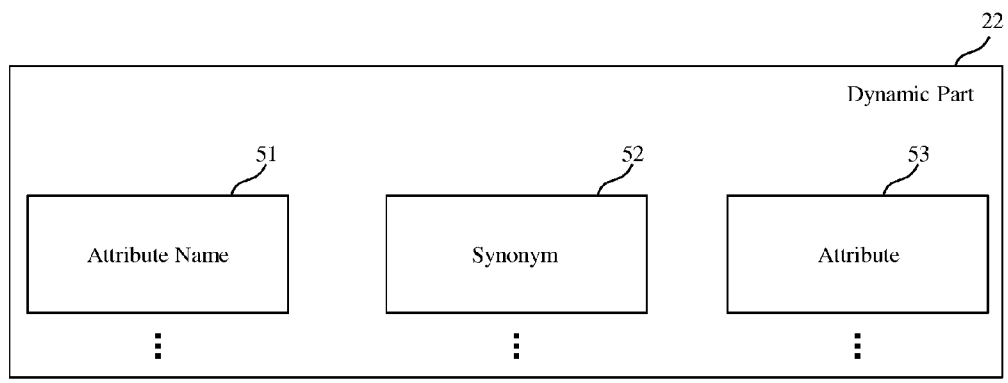
FIG. 5 is a schematic block diagram of a dynamic part of a valid query template.

In FIG. 5, a schematic block diagram of a dynamic part 22 of a valid query template 20 is shown. It includes an attribute name 51 and may include synonyms 52 thereof, representing an attribute 53 of an entity of the database. This may be an attribute within the same (i.e., first) entity as represented by the static part 21, or an attribute in a different (i.e., second) entity, which is linked to the first entity via a primary-foreign key dependency. When generating valid queries, the attribute names 51 and their synonyms 52 of the dynamic parts 22 in a valid query template 20 are matched against the actual data of the database which is represented by the attribute 53. Resulting matches (i.e., the actual data) replaces the dynamic parts 22 to yield valid queries.

Figure 6:
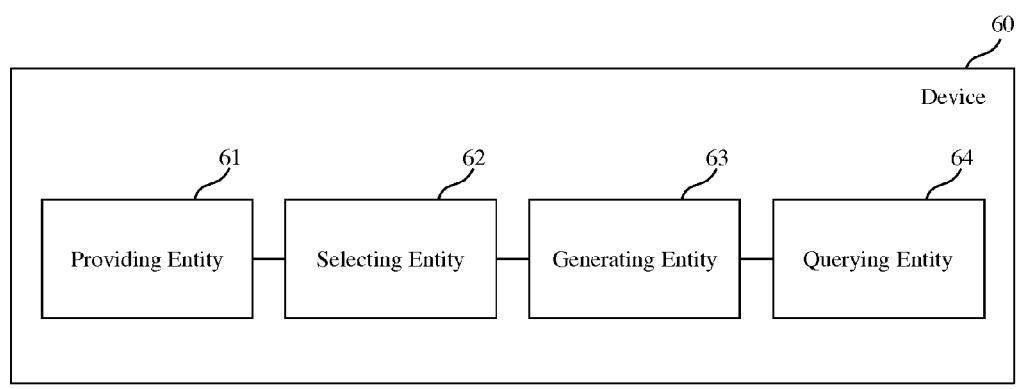
FIG. 6 is a schematic block diagram of an embodiment of a device for guided keyword-based exploration of data stored in a database.

In FIG. 6, a device 60 for guided keyword-based exploration of data stored in a database is detected. The device 60 of FIG. 6 comprises a providing entity 61, a selecting entity 62, a generating entity 63, and a querying entity 64. The providing entity 61 is adapted to provide valid query templates 20 for the data, wherein the provided valid query templates 20 include static parts 21 and dynamic parts 22. The selecting entity 62 is adapted to select those of the provided valid query templates 20 that match a user-provided keyword. The generating entity 63 is adapted to generate valid queries from the selected valid query templates 20 using the data. The querying entity 64 is adapted to query the data using a user-selected valid query selected from the generated valid queries.

Figure 8:
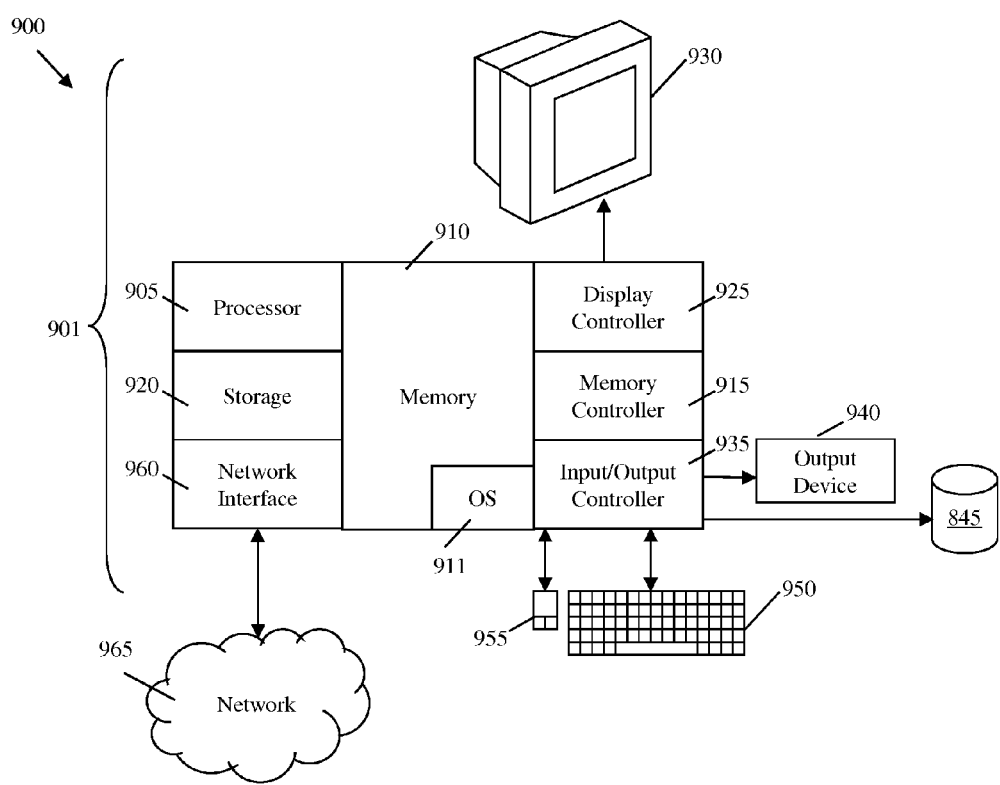
FIG. 8 is a schematic block diagram of an embodiment of a system adapted for performing the method for guided keyword-based exploration of data stored in a database.

FIG. 8 shows a schematic block diagram of an embodiment of a system adapted for performing the method for guided keyword-based exploration of data stored in a database.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above methods of FIG. 1 or 3 may be implemented in software, as an executable program, the latter executed by suitable digital processing devices. More generally, embodiments of the present invention may be implemented wherein general-purpose digital computers, such as personal computers, workstations, etc., are used.

For instance, the system 900 depicted in FIG. 8 schematically represents a computerized unit 901, e.g., a general-purpose computer. In exemplary embodiments, in terms of hardware architecture, as shown in FIG. 8, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 8, the software in the memory 910 includes methods described herein in accordance with exemplary embodiments and a suitable operating system (OS) 911. The OS 911 essentially controls the execution of other computer programs, such as the methods as described herein (e.g., FIG. 2), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 2 are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS 101-105 method operations
20 valid query template
21 static part
22 dynamic part
23 view template
301-307 method operations
41 text label
42 set of tuples
51 attribute name
52 synonym
53 attribute
60 device
61 providing entity
62 selecting entity
63 generating entity
64 querying entity

REFERENCES

[1] V. Hristidis and Y. Papakonstantinou. Discover: Keyword search in relational databases. In VLDB, pages 670-681, 2002.

[2] S. Agrawal, S. Chaudhuri, and G. Das. Dbxplorer: A system for keyword-based search over relational databases. In Data Engineering, 2002. Proceedings. 18th International Conference on, pages 5-16. IEEE, 2002.

[3] G. Bhalotia, A. Hulgeri, C. Nakhe, S. Chakrabarti, and S. Sudarshan. Keyword searching and browsing in databases using banks. In ICDE, pages 431-440, 2002.

[4] S. Sankar. Under the hood: Indexing and ranking in graph search. http://goo.gl/jHKCK, Mar. 14, 2013.

[5] X. Li and M. Boucher. Under the hood: The natural language interface of graph search. http://goo.gl/bPlHb, Apr. 29, 2013.

[6] M. Curtiss, I. Becker, T. Bosman, S. Doroshenko, L. Grijincu, T. Jackson, S. Kunnatur, S. Lassen, P. Pronin, S. Sankar, et al. Unicorn: a system for searching the social graph. Proceedings of the VLDB Endowment, 6(11):1150-1161, 2013.

What is claimed is:

1. A method for guided keyword-based exploration of data stored in a database, the method comprising:
providing, by a processing device, valid query templates for the data stored in the database, wherein the provided valid query templates include static parts and dynamic parts, wherein the static part of at least one valid query template of the valid query templates includes a text label that identifies a set of tuples of a first entity of the database, wherein the first entity of the database comprises a finite set of tuples all having a same finite set of attributes, wherein the dynamic part of the valid query template includes attribute names and synonyms that identify at least one attribute of a second entity of the database with a primary-foreign key dependency to the first entity, wherein the second entity is different from the first entity identified by the static part;
selecting, by the processing device, those of the provided valid query templates that match a user-provided keyword;
generating, by the processing device, valid queries from the selected valid query templates by instantiation using the data stored in the database;
ranking, by the processing device, subsets of the generated valid queries by a ranking algorithm operating on a tree data structure which represents all valid queries into the data stored in the database, the ranking algorithm exploiting structural properties of the tree data structure, wherein the subsets of the generated valid queries are ranked according to a metric which accounts for the user, relevance and coverage of one of the generated valid queries of one of the subsets, and diversity among the generated valid queries of one of the subsets;
presenting, by the processing device, a top-ranked subset of the ranked subsets; and
querying, by the processing device, the data stored in the database using a user-selected valid query selected from the presented top-ranked subset.

2. The method of claim 1, wherein:
the valid query templates are provided such that they include the static parts, the dynamic parts and a view template; and
the data stored in the database queried using a user-selected valid keyword is displayed using the view template.

3. The method of claim 1, wherein the data stored in the database is embodied as one of structured or semi-structured data.

4. The method of claim 1, wherein the valid query templates are derived via an analysis of a query log of the data stored in the database.

5. The method of claim 1, wherein the dynamic part of the valid query template includes attribute names and synonyms thereof representing the at least one attribute of the second entity with the primary-foreign key dependency to the first entity.

6. The method of claim 5, wherein the valid query is generated by populating the attribute names of one of the selected valid query templates by a sub-quantity of the data stored on the database represented by the attribute names or the synonyms thereof, in the event the sub-quantity of the data stored in the database matches the user-provided keyword.

7. The method of claim 1, wherein the valid query template is selected in the event the text label representing the set of tuples of the first entity matches the user-provided keyword.

8. The method of claim 7, wherein the matching is based on a combination of string similarity measures.

9. The method of claim 1, wherein the relevance of the generated valid query of one of the subsets is determined by a degree to which it matches with the user-provided keyword.

10. The method of claim 1, wherein:
the coverage of the generated valid query is determined by a sum of relevance of all potential valid queries which can be composed out of the generated valid query; and
the diversity of a subset of the generated valid queries is determined by a minimum dissimilarity of any two valid queries in the subset of the generated valid queries.

11. A non transitory computer readable storage medium having computer readable instructions stored thereon that, when executed by a computer, implement a method for guided keyword-based exploration of data stored in a database, the method comprising:
providing valid query templates for the data stored in the database, wherein the provided valid query templates include static parts and dynamic parts, wherein the static part of at least one valid query template of the valid query templates includes a text label that identifies a set of tuples of a first entity of the database, wherein the first entity of the database comprises a finite set of tuples all having a same finite set of attributes, wherein the dynamic part of the valid query template includes attribute names and synonyms that identify at least one attribute of a second entity of the database with a primary-foreign key dependency to the first entity, wherein the second entity is different from the first entity identified by the static part;
selecting those of the provided valid query templates that match a user-provided keyword;
generating valid queries from the selected valid query templates by instantiation using the data stored in the database;
ranking subsets of the generated valid queries by a ranking algorithm operating on a tree data structure which represents all valid queries into the data stored in the database, the ranking algorithm exploiting structural properties of the tree data structure, wherein the subsets of the generated valid queries are ranked according to a metric which accounts for the user, relevance and coverage of one of the generated valid queries of one of the subsets, and diversity among the generated valid queries of one of the subsets;
presenting a top-ranked subset of the ranked subsets; and
querying the data stored in the database using a user-selected valid query selected from the presented top-ranked subset.

12. A system for guided keyword-based exploration of data stored in a database, comprising:
a processing device configured to execute a providing entity, a selecting entity, and a generating entity;
wherein the providing entity, executed by the processing device, is configured to provide valid query templates for the data stored in the database, wherein the provided valid query templates include static parts and dynamic parts, wherein the static part of at least one valid query template of the valid query templates includes a text label that identifies a set of tuples of a first entity of the database, wherein the first entity of the database comprises a finite set of tuples all having a same finite set of attributes, wherein the dynamic part of the valid query template includes attribute names and synonyms that identify at least one attribute of a second entity of the database with a primary-foreign key dependency to the first entity, wherein the second entity is different from the first entity identified by the static part;
wherein the selecting entity, executed by the processing device, is configured to select those of the provided valid query template that match a user-provided keyword;
wherein the generating entity, executed by the processing device, is configured to generate valid queries from the selected valid query templates by instantiation using the data stored in the database; and
wherein the processing device is further configured to:
rank subsets of the generated valid queries by a ranking algorithm operating on a tree data structure which represents all valid queries into the data stored in the database, the ranking algorithm exploiting structural properties of the tree data structure, wherein the subsets of the generated valid queries are ranked according to a metric which accounts for the user, relevance and coverage of one of the generated valid queries of one of the subsets, and diversity among the generated valid queries of one of the subsets;
present a top-ranked subset of the ranked subsets; and
query the data stored in the database using a user-selected valid query selected from the presented top-ranked subset.

13. The system of claim 12, wherein:
the valid query templates are provided such that they include the static parts, the dynamic parts and a view template; and
the data stored in the database queried using a user-selected valid keyword is displayed using the view template.

14. The system of claim 12, wherein the data stored in the database is embodied as one of structured or semi-structured data.

15. The system of claim 12, wherein the valid query templates are derived via an analysis of a query log of the data stored in the database.

* * * * *